(12) United States Patent
Paran et al.

(10) Patent No.: US 11,328,603 B1
(45) Date of Patent: May 10, 2022

(54) SAFETY SERVICE BY USING EDGE COMPUTING

(71) Applicant: Amdocs Development Limited, Limassol (CY)

(72) Inventors: Eran Paran, Hod Hasharon (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 263 days.

(21) Appl. No.: 16/671,029

(22) Filed: Oct. 31, 2019

(51) Int. Cl.
| | |
|---|---|
| *G08G 1/16* | (2006.01) |
| *H04W 4/90* | (2018.01) |
| *G08B 21/02* | (2006.01) |
| *H04W 4/021* | (2018.01) |
| *G06T 7/215* | (2017.01) |
| *G06V 40/10* | (2022.01) |
| *G06V 20/52* | (2022.01) |

(52) U.S. Cl.
CPC ............ *G08G 1/166* (2013.01); *G06T 7/215* (2017.01); *G06V 20/53* (2022.01); *G06V 40/103* (2022.01); *G08B 21/02* (2013.01); *H04W 4/021* (2013.01); *H04W 4/90* (2018.02)

(58) Field of Classification Search
None
See application file for complete search history.

(56) References Cited

U.S. PATENT DOCUMENTS

| | | | | |
|---|---|---|---|---|
| 10,496,888 | B2* | 12/2019 | Zhao | .......................... G06T 7/20 |
| 2008/0189000 | A1* | 8/2008 | Duong | ...................... B60T 7/22 |
| | | | | 701/20 |
| 2010/0082244 | A1* | 4/2010 | Yamaguchi | ............. G08G 1/167 |
| | | | | 701/532 |
| 2013/0150004 | A1* | 6/2013 | Rosen | ................... H04W 48/04 |
| | | | | 455/414.1 |
| 2014/0045481 | A1* | 2/2014 | Fraley | ................ H04N 21/4586 |
| | | | | 455/418 |
| 2015/0054639 | A1* | 2/2015 | Rosen | .................. H04M 3/2281 |
| | | | | 340/439 |
| 2015/0094118 | A1* | 4/2015 | Rodolico | ............ H04M 1/0264 |
| | | | | 455/566 |
| 2019/0180624 | A1* | 6/2019 | Hassan-Shafique | .... G01S 17/86 |
| 2020/0272155 | A1* | 8/2020 | Lo | ......................... G05D 1/0212 |

* cited by examiner

*Primary Examiner* — Santiago Garcia
(74) *Attorney, Agent, or Firm* — Zilka-Kotab, P.C.

(57) ABSTRACT

Presented herein are methods and systems for alerting users identified in a monitored location, by an edge node located at an edge of a network, to be preoccupied by interaction with client devices of potential risk events, comprising analyzing, at the edge node, images captured by one or more imaging sensors deployed to monitor a monitored location in order to estimate a motion pattern of one or more passerby users preoccupied by watching a screen of a client device, analyzing the images with respect to the estimated motion pattern(s) to identify a potential risk event involving one or more of the preoccupied passerby users and transmitting one or more warning messages alert one or more of the preoccupied passerby users of the potential risk event.

15 Claims, 3 Drawing Sheets

SAFETY SERVICE BY USING EDGE COMPUTING

BACKGROUND

The present invention, in some embodiments thereof, relates to identifying users preoccupied by interaction with client devices and alerting them of potential risk events, and, more specifically, but not exclusively, to edge nodes connected at network edges and configured to identify users preoccupied by watching the screen of their client devices and alert them of potential risk events.

Modern times have seen mobile devices such as, for example, smartphones, tablets, smart watches and/or the like becoming the main means and platform for content consumption, communication, social media networking, gaming, leisure time spending and/or the like for most people.

While such activities present no major concern at most times, using these mobile devices while engaged in other activities may present increasing concern and risk, in particular when used while travelling, walking, riding and/or driving in public places. People preoccupied with their client devices may be unaware, inattentive and/or oblivious to their surrounding environment and may be thus exposed to major hazards and potential risk, for example, stepping into and/or tripping over obstacles, colliding with other people and/or colliding with vehicles which may lead to damage, injury and even death.

SUMMARY

According to a first aspect of the present invention there is provided a computer implemented method of transmitting warning messages to alert users preoccupied by interaction with client devices of potential risk events, comprising using one or more processors of an edge node located at an edge of a network for:
  Analyzing one or more images captured by one or more imaging sensors deployed to monitor a monitored location to estimate a motion pattern of one or more passerby users preoccupied by watching a screen of a client device.
  Analyzing one or more of the images with respect to the estimated motion pattern to identify a potential risk event involving one or more of the preoccupied passerby users.
  Transmitting one or more warning messages alert one or more of the preoccupied passerby users of the potential risk event.

According to a second aspect of the present invention there is provided a system for transmitting warning messages to alert users preoccupied by interaction with client devices of potential risk events, comprising a storage storing a code and one or more processors of an edge node located at an edge of a network. One or more of the processors are coupled to the storage for executing the stored code. The code comprising:
  Code instructions to analyze one or more images captured by one or more imaging sensors deployed to monitor a monitored location to estimate a motion pattern of one or more passerby users preoccupied by watching a screen of a client device.
  Code instructions to analyze one or more of the images with respect to the estimated motion pattern to identify a potential risk event involving the one or more preoccupied passerby user.
  Code instructions to transmit one or more warning messages to alert one or more of the preoccupied passerby users of the potential risk event.

In a further implementation form of the first and/or second aspects, one or more of the warning messages are transmitted by operating one or more directional speakers deployed in the monitored location to generate one or more audible warning messages transmitted towards a specific location of one or more of the preoccupied passerby users.

In a further implementation form of the first and/or second aspects, one or more of the passerby users are determined to be preoccupied by watching the screen of the client device based on analysis of one or more of the images.

In a further implementation form of the first and/or second aspects, one or more of the warning messages are transmitted to the respective client device correlated with each of one or more of the preoccupied passerby users.

In a further implementation form of the first and/or second aspects, one or more of the passerby users are determined to be preoccupied by watching the screen of the client device based on an engagement indication received from the correlated client device.

In a further implementation form of the first and/or second aspects, one or more client devices are correlated with respective preoccupied passerby users according to face recognition of the respective preoccupied passerby user based on the analysis of one or more of the images compared to a stored record correlating the face of the respective user with an identifier of the client device.

In a further implementation form of the first and/or second aspects, one or more client devices are correlated with respective preoccupied passerby users according to a relative location of the respective client device with respect to the respective preoccupied passerby user. The relative location is determined based on a signaling hand-shake conducted with the respective client device. The signaling hand-shake is based on one or more of:
  Detecting a visual signal generated by the correlated client device in response to a message received from the edge node.
  Detecting an audio signal generated by the correlated client device in response to a message received from the edge node.
  Communicating with the correlated client device via one or more close proximity RF communication channels.
  Triangulating the correlated client device in the monitored location.

In a further implementation form of the first and/or second aspects, the potential risk event comprises one or more members of a group consisting of: one or more of the preoccupied passerby users tripping on an obstacle identified in the monitored location, one or more of the preoccupied passerby users colliding with one or more other passerby persons and one or more of the preoccupied passerby users colliding with a vehicle.

In a further implementation form of the first and/or second aspects, the potential risk event presents potential harm to one or more of the preoccupied passerby users, one or more other persons and/or a combination thereof. The potential harm comprises injury, death and/or damage to property.

In an optional implementation form of the first and/or second aspects, one or more of the warning messages are transmitted according to a risk score computed for the potential risk event based on one or more event attributes of the potential risk event.

In an optional implementation form of the first and/or second aspects, one or more of the warning messages are transmitted according to a responsiveness score computed for one or more of the preoccupied passerby users based on one or more user attributes of the respective preoccupied passerby user.

In an optional implementation form of the first and/or second aspects, one or more of the warning messages are transmitted to a safety service agent executed by one or more client devices each correlated with respective one or more preoccupied passerby users and registered to the safety service at the edge node.

In an optional implementation form of the first and/or second aspects, one or more of the warning messages are transmitted according to one or more rules defined by a user profile of one or more of the preoccupied passerby users in the safety service.

In an optional implementation form of the first and/or second aspects, one or more of the attention messages are transmitted to the correlated client device of one or more of the preoccupied passerby users to alert the respective preoccupied passerby user of one or more potential non-risk events requiring his attention. The potential non-risk events defined by one or more of the rules comprise: one or more other persons attempt to draw attention of the respective preoccupied passerby user, one or more other persons associated with the respective preoccupied passerby user attempt to draw attention of the respective preoccupied passerby user, attention of a plurality of people is focused on a certain object in the monitored location and/or attention of a plurality of people in the monitored location is focused in a certain direction.

In an optional implementation form of the first and/or second aspects, one or more of the warning messages are transmitted according to a monitoring mode set for the one or more of the preoccupied passerby users in the safety service agent executed by their correlated client devices. The monitoring mode comprising a disable mode, a monitored mode in which monitoring the respective preoccupied passerby user by the edge node is enabled and/or a self-protection mode in which the correlated client device may self-generate one or more warning messages independently of the edge node.

In an optional implementation form of the first and/or second aspects, a plurality of preoccupied passerby users identified in the monitored location are monitored and/or alerted of a plurality of potential risk events according to priority order computed for the plurality of preoccupied passerby users based on a potential risk event score computed for each of the plurality of users according to the motion pattern estimated for the respective preoccupied passerby user with respect the potential risk event presenting potential harm to the respective preoccupied passerby user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
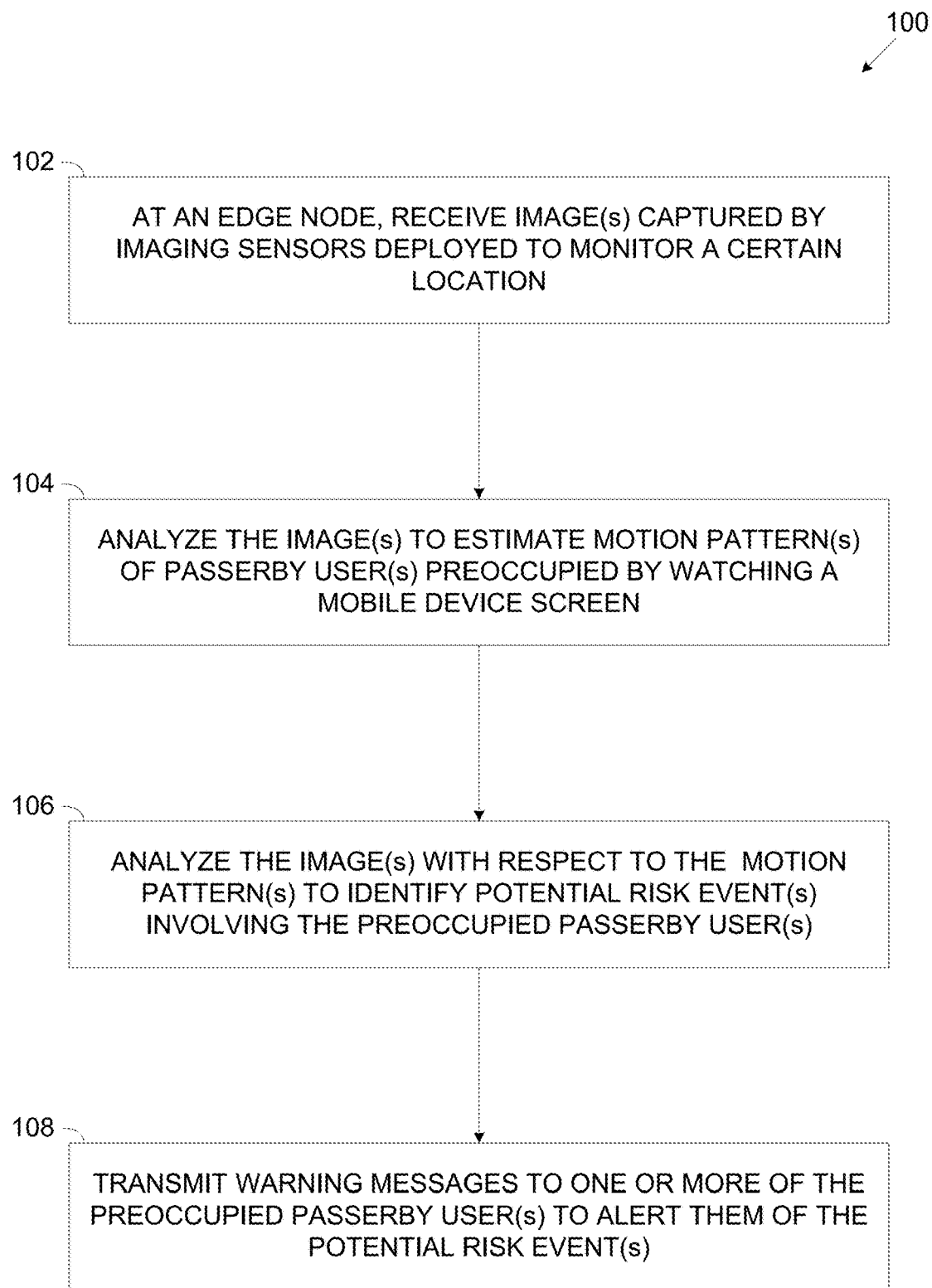
FIG. 1 is a flowchart of an exemplary process of identifying a potential risk event involving passerby users preoccupied with their mobile devices and alerting them accordingly, according to some embodiments of the present invention.

The present invention, in some embodiments thereof, relates to identifying users preoccupied by interaction with client devices and alerting them of potential risk events, and, more specifically, but not exclusively, to edge nodes connected at network edges and configured to identify users preoccupied by watching the screen of their client devices and alert them of potential risk events.

According to some embodiments of the present invention, there are provided methods and systems for identifying potential risk events which may involve one or more passerby users (e.g. pedestrians, drivers, bike riders, etc.) preoccupied with their mobile device (e.g. smartphone, tablet, smart watch, etc.) and thus inattentive to the environment and its potential hazards (risk events) which may harm the preoccupied passerby users, for example, colliding with a vehicle, colliding with another passerby, tripping into, over and/or on an obstacle and/or the like. In case one or more of the preoccupied passerby users are estimated to be involved in such potential risk events, warning messages may be transmitted to alert the preoccupied passerby user(s) of the potential risk event(s).

In particular, identifying the preoccupied passerby users in one or more monitored locations and alerting them accordingly of the potential risk events may be done by one or more edge network nodes (e.g. server, computing node, etc.) which are associated and/or part of a safety system (service) and connected at the edges networks providing one or more services to the mobile devices used by the passerby users and are thus in close network proximity to these mobile devices. The close network proximity may be expressed by very few hops and significantly low latency for network traffic to travel between the edge nodes and the mobile devices.

The edge network safety system may receive one or more images (e.g. still images, video clips, etc.) captured by one or more imaging sensors (e.g. camera, video camera, infrared camera, night vision camera, thermal camera, etc.) deployed to capture images depicting a monitored location, typically a public location, for example, a street, an intersection, a railway station, a shopping mall and/or the like in which one or more passerby users may be located, travelling through and/or passing by.

Optionally, the edge node is implemented in a vehicle, for example, a smart car connected to the network (specifically at the network edge) which is located in the monitored location (e.g. parked, passing through) and capable of capturing images depicting at least part of the monitored location. In particular, the vehicular edge node may receive images captured by one or more imaging sensors mounted, installed and/or integrated in the vehicle having a field of view depicting at least part of the monitored location. The vehicular edge node may communicate via the network with one or more of the imaging sensors statically deployed in the monitored location to receive images captured by these imaging sensor(s).

One or more of the passerby users may be preoccupied by interaction with their client devices, specifically preoccupied by watching the screen of their respective client devices, for example, consuming multimedia content, reading and/or texting messages, playing a game, interacting with a social media network and/or the like. As they are preoccupied and watching their mobile device screen, these preoccupied passerby users may be at least partially inattentive and/or oblivious to their surrounding environment and may be thus exposed to one or more of the potential risk events.

The edge node safety system may determine whether one or more of the passerby users are preoccupied based on analysis of one or more of the images captured by the imaging devices deployed in the monitored location, for example, by identifying certain bodily postures, head postures, eye gaze direction, hand gestures and/or the like indicative of the passerby users being preoccupied by watching their client device's screen.

Optionally, one or more of the passerby users are correlated with their associated client devices. In such case the edge node safety system may identify one or more of the preoccupied passerby users based on engagement indications received from their correlated client devices indicating that the associated passerby users are preoccupied by watching their client device's screen. The correlation may be achieved for example, based on recognition (e.g. face recognition) of the passerby user and retrieval of his associated client device identifier (e.g. phone number, network address, etc.) from a stored record created for the recognized passerby users. In another example, the correlation may be done based on a relative location of the client device with respect to the location of its associated passerby user.

The edge node safety system may further analyze one or more of the images captured by the imaging device(s) to estimate a motion pattern, for example, advancement direction (vector), speed, acceleration and/or the like of one or more of the preoccupied passerby users.

The edge node safety system may then further analyze the images to identify one or more of the potential risk events involving one or more of the identified preoccupied passerby users. Specifically, the edge node safety system may analyze the images to predict, estimate and/or identify the potential risk events with respect to the estimated motion patterns computed for one or more of the preoccupied passerby users, for example, a collision with a static obstacle located in the estimated path of the preoccupied passerby users, a collision with another passerby person crossing the estimated path, a collision with a vehicle (e.g. car, bicycle, train, etc.) crossing the estimated path and/or the like.

The edge node safety system may then transmit one or more warning messages to alert the preoccupied passerby users of the potential risk event(s). The edge node safety system may transmit the warning messages by operating one or more directional speakers deployed in the monitored location and configured to emit a significantly narrow sound beam that is directed towards the preoccupied passerby user(s) that is estimated to be involved in the potential risk event(s).

However, in case one or more of the preoccupied passerby users are correlated with their respective associated client devices, the edge node safety system, using the identifier of the correlated client devices, may transmit the warning messages directly to the correlated client devices in one or more modes, for example, a text message, a voice message, a popup, a screen blanking, a vibration and/or a combination thereof.

Moreover, the client device used by one or more of the preoccupied passerby users may execute a local safety service agent (application) which may communicate with the edge node safety system. The edge node safety system may therefore transmit one or more of the warning messages to one or more of the correlated client devices by communicating with the local safety service agent executed by the client device.

Optionally, the local safety service agent communicating with the edge node safety system operates in one of a plurality of monitor and/or alert modes which may define the monitor and/or alert services provided to the respective preoccupied passerby user. These modes may include, for example, a disable mode in which the edge node safety system does not monitor or alert the respective preoccupied passerby user, a monitored mode in which the edge node safety system monitors and alerts the respective preoccupied passerby user, a self-monitoring mode in which the client device 204 may monitor its surrounding environment itself and issue warning messages accordingly independently of the edge node safety system.

Optionally, the edge node safety system monitors the preoccupied passerby users and alerts them accordingly of the potential risk events according to a risk score assigned to each of the potential risk events, for example, a severity of the potential risk events, an estimated harm to the involved preoccupied passerby users, a number of involved preoccupied passerby users and/or the like.

Optionally, the edge node safety system monitors the preoccupied passerby users and alerts them accordingly of the potential risk events according to a responsiveness score computed for one or more of the preoccupied passerby users to reflect an awareness level, an attentiveness level and/or responsiveness level of the respective preoccupied passerby user.

Optionally, the safety application monitors the preoccupied passerby users and alerts them accordingly of the potential risk events according to a priority order computed for the plurality of preoccupied passerby users based on a potential risk event score computed for each of the plurality of potential risk events. The safety application may compute the potential risk event score, for example, by aggregating the risk score computed for the potential risk event and the responsiveness score computed for one or more of the preoccupied passerby users estimated to be involved in the respective potential risk event.

Optionally, the safety application monitors one or more of the preoccupied passerby users and alerts them accordingly of the potential risk events according to a user profile defined for each of these preoccupied passerby users. Specifically, these preoccupied passerby users are registered users who are registered to the safety service comprising the edge node safety system. The registered users may define one or more rules in their user profiles to adjust the monitor and/or alert services provided by the safety service to the respective registered user, specifically when identified as a preoccupied passerby user in one or more locations monitored by one or more edge node safety systems.

Optionally, the edge node safety system monitors one or more of the preoccupied passerby users identified in the monitored location in order to identify one or more potential non-risk events involving the preoccupied passerby users and alert them accordingly. In particular, the safety system identifies and/or estimates the potential non-risk events according to one or more rules defined in the user profile of one or more of the preoccupied passerby users identified in the monitored location. The potential non-risk events may include, for example, an event in which one or more other persons detected in the monitored location attempts to draw attention of a certain preoccupied passerby user. In another example, the potential non-risk events may include an event in which one or more other persons associated with the preoccupied passerby user (e.g. child, family member, etc.) attempts to draw attention of the preoccupied passerby user. In another example, the potential non-risk events may include an event in which the attention of a plurality of people is focused on a certain object, in a certain direction and/or the like which may indicate that something of importance and/or notice is taking place at the point of focus.

The safety service in general and the edge node safety system in particular may present major benefits and advantages compared to existing methods for detecting and/or alerting preoccupied passerby users who may be involved in risky situations.

First, the phenomena of people using client devices and preoccupied with them, specifically watching the screen of their mobile devices while walking or driving has become a major concern in modern days as these preoccupied people may be involved and/or exposed to major hazards that may inflict harm to themselves and/or others. Therefore, deploying the safety service for identifying such preoccupied users and alerting them of potential risk events may serve to prevent and/or minimize the impact of such risk events thus significantly reducing the harm these preoccupied users may suffer and/or harm inflicted by those preoccupied users on others.

Some of the existing methods to prevent the potential risk events and their consequences may include, for example, assigning a dedicated path, for example, a sidewalk lane, a crossroad section and/or the like for users preoccupied with their client devices. Such solutions however may suffer major limitation since it may be expensive and in many cases unfeasible to allocate public area space specifically for the preoccupied users. The safety service however, relies on detection of the preoccupied users among other people in the public space using simple and relatively low cost equipment such as cameras which may be already deployed in many public locations for other applications and uses and as such does not require allocation of precious and possibly unavailable public space. The safety service may therefore provide a low cost easy to deploy solution which may be applied in practically any location for effectively detecting the preoccupied users, estimating their involvement in potential risk events and alerting them accordingly.

Other existing methods to prevent the potential risk events and their consequences may be based on the capabilities of the mobile devices themselves, specifically the camera(s) of the mobile device to detect that their associated user is preoccupied, estimating their involvement in potential risk events and alerting them accordingly. These mobile device based solution may be highly limited since the camera(s) of the client device may be very limited in its field of view and thus unable to effectively capture a wide range of the surrounding environment of the preoccupied user and thus fail to detect close by and/or approaching obstacles, people and/or vehicles. The safety service on the other hand is based on images captured by one or more imaging sensors deployed to provide a wide field of view of the monitored locations and is thus capable of effectively detecting the potential risk events which may involve obstacles, people and/or vehicles which are currently further away from the preoccupied user and may hence not be detected by the mobile device's camera(s) but may present risk to the preoccupied user.

Moreover, the mobile device may have limited computing resources, for example, processing resources, storage resources, network resources, etc. and/or computing time and may be thus limited in processing the images captured by the mobile device's camera(s), which may lead to failure to effectively detect the potential risk events and/or induce a major latency in the detection due to extended processing time. In contrast, the safety service may employ higher computing resources in order to effectively and rapidly detect the potential risk events relating to one or more of the preoccupied users and alert them accordingly.

Furthermore, deploying the safety service in the edge nodes which are located in close network proximity to the client devices of the preoccupied users may significantly reduce the latency for receiving the sensory data, i.e. the images from the imaging sensors deployed to monitor the monitored location and for alerting the preoccupied users who may be involved in the potential risk events. The overall time required for the edge node safety system to identify preoccupied users, estimate their involvement in imminent potential risk events and alerting them of the potential risk events may be therefore significantly reduced and the preoccupied users may be efficiently alerted in time to prevent and/or at least minimize the harm inflicted by the potential risk event(s). Moreover, deploying the safety service in the edge nodes may significantly reduce the networking resources which may be required to transfer the images to a remote network location where the images are processed to identify the preoccupied users and/or the potential risk events. Analyzing the images at the edge node safety systems may therefore require significantly reduced networking resources for establishing the safety service for the users. Furthermore, deploying the safety service in the edge nodes may significantly increase privacy of the passerby users. Even if recognized by the edge node in the monitored location, the edge node may erase any records and data relating to the passerby users including, for example, images, identification information, tracking time and/or the like immediately following the potential risk events whether they actually occurred or not, thus preserving the passerby users' privacy.

In addition, based on the risk score, high scoring potential risk events which may involve major harm and/or damage to the preoccupied users may be processed while lower risk score potential risk events presenting low and possibly negligible harm may be discarded. This may significantly reduce the computing resources and/or computing time required by the edge node safety systems to monitor the preoccupied users and alert them accordingly. Moreover, based on the responsiveness score, the safety system may focus on monitoring and alerting low scoring preoccupied users who may be less attentive while avoiding high scoring preoccupied users who may be highly aware of their surrounding environment. This may further reduce the computing resources and/or computing time required by the edge node safety systems to monitor the preoccupied users and alert them accordingly. In addition, prioritizing the potential risk events according to the preoccupied users involved in them may further enable the safety system to focus on processing the high priority potential risk events and reduce overall computing resources and/or computing time. Moreover, applying the risk score, the responsiveness score and/or the risk events prioritization may enable high scalability of the edge node safety systems which may monitor, identify and alert the preoccupied users of the potential risk events according to the computing resources available to the edge node safety system. As such, high resources edge nodes may process more potential risk events involving more preoccupied users while lower resources edge nodes may focus on only part of the potential risk events involving and/or preoccupied users having highest priority.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of identifying a potential risk event involving passerby users preoccupied with their mobile devices and alerting them accordingly, according to some embodiments of the present invention. An exemplary process 100 may be executed to identify potential risk events which may involve one or more passerby users (e.g. pedestrians, drivers, bike riders, etc.) preoccupied with their mobile device and thus inattentive to the environment and its potential hazards, for example, colliding with a vehicle, colliding with another passerby, tripping on an obstacle and/or the like. In case one or more of the preoccupied passerby users are estimated to be involved in such potential risk events, warning messages may be transmitted to alert the preoccupied passerby user(s) of the potential risk event(s).

In particular, the process 100 may be executed by a safety system deployed in an edge network node which is located at the edge of a network providing one or more services to the mobile devices used by the passerby users and is thus in close network proximity to these mobile devices.

Figure 2:
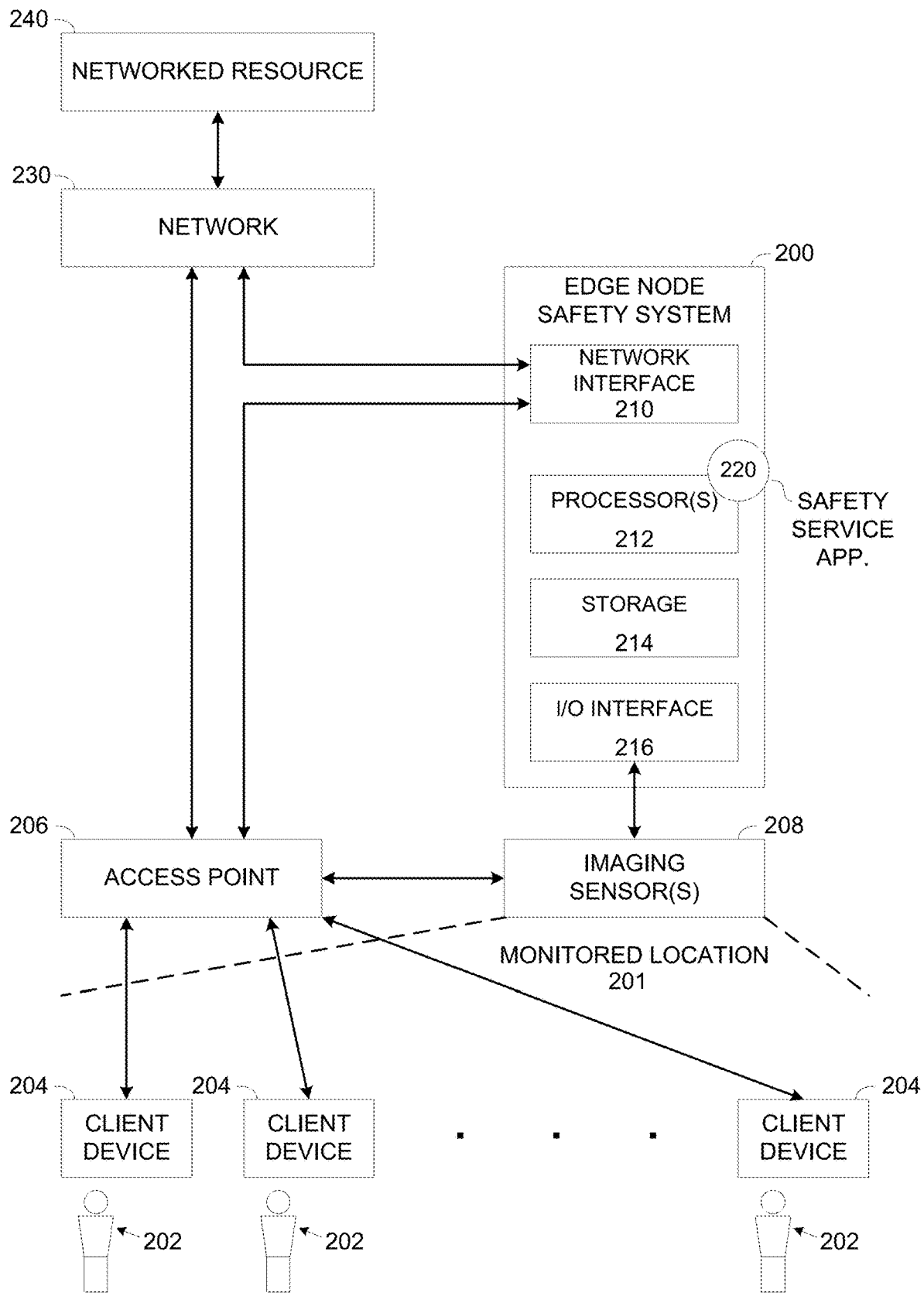
FIG. 2 is a schematic illustration of an exemplary system for identifying a potential risk event involving passerby users preoccupied with their mobile devices and alerting them accordingly, according to some embodiments of the present invention.

Reference is also made to FIG. 2, which is a schematic illustration of an exemplary system for identifying a potential risk event involving passerby users preoccupied with their mobile devices and alerting them accordingly, according to some embodiments of the present invention.

One or more passerby persons (users) 202, for example, a pedestrian, a bicycle rider, a vehicle (e.g. car, bus, track, motorcycle, etc.) driver and/or the like may pass in and/or through a monitored location 201 which is monitored by one or more sensors 208, in particular, imaging sensors 208, for example, a camera, a video camera, an infrared camera, a night vision camera, a thermal imaging sensor and/or the like deployed to capture images of the monitored location 201. The monitored location 201 may typically be a public location, for example, a street, an intersection, a railway station, a shopping mall and/or the like in which one or more passerby users 202 may be located, travelling through and/or passing by.

One or more of the passerby users 202 are preoccupied by interaction with their client devices 204, for example, a Smartphone, a tablet, a smart watch and/or the like. For example, the passerby user(s) 202 may be preoccupied by watching the screen of their client device 204, for example, consuming multimedia content, reading and/or texting messages, playing a game, interacting with a social media network and/or the like. The preoccupied passerby users 202 may be therefore at least partially inattentive and/or oblivious to the surrounding environment of the monitored location 201 and may be thus exposed to one or more of the potential risk events.

The client devices 204 may typically wirelessly connect to a network 230 via one or more wireless connections, for example, a Wireless Local Area Network (WLAN) (e.g. Wi-Fi), a cellular link and/or the like. The network 230 may comprise one or more wired and/or wireless network, for example, a Local Area Network (LAN), a WLAN, a Wide Area Network (WAN), a Municipal Area Network (MAN), a cellular network, the internet and/or the like.

Via the network 230, the client devices 202 may connect to one or more networked resources 240, for example, a server, a computing node, a cluster of computing nodes, a cloud resource, a cloud service, a cloud platform and/or the like providing one or more services to the client devices 202, for example, multimedia (audio, video, etc.) streaming, online gaming, social media networking, texting services and/or the like.

The client devices 204 may access the network 230, i.e. connect to the network 230 via one or more access points 206, in particular, wireless access points 206, for example, a wireless access point (e.g. Wi-Fi access point), a wireless network router (e.g. Wi-Fi router), a cellular base station and/or the like. The access point(s) 206 which is connected to the network 230 and located at the edge of the network 230 is configured to provide network connectivity, specifically wireless network connectivity (e.g. Wi-Fi connection, cellular link, etc.) to the client device(s) 204 located within their coverage range. The access point(s) 206 deployed to provide network connectivity in the monitored location 201 may therefore provide network connectivity to the client devices 204 (currently) located in the monitored location 201.

A safety system 200, for example, a server, a computing node, a cluster of computing nodes and/or the like may execute the process 100 to identify one or more of the preoccupied passerby users 202 which may be involved in one or more imminent potential risk events and transmit one or more warning messages to alert the preoccupied user(s) 202 of the potential risk event(s).

In particular, the safety system 200 may be deployed in one or more edge network nodes deployed at the edge of the network 230 in the monitored location 201. As such, the edge node safety system 200 is in close network proximity to the client device(s) 204 currently located in the monitored location 201 and connecting to the network via the access point(s) 206.

Optionally, the safety system 200 is deployed and/or utilized as a vehicular edge node in a vehicle, for example, a smart car, an autonomous car and/or the like connected to the network 230, specifically at the network edge, for example, to one or more of the access points 206. The vehicular edge node safety system 200 may receive one or more images from one or more imaging sensors 208 which are mounted, installed and/or integrated in the vehicle (e.g. smart car). In particular, the vehicular edge node safety system 200 may be utilized when the vehicle is located in the monitored location 201, for example, parked, passing through and/or the like such that its imaging sensor(s) 208 have a field of view depicting at least part of the monitored location 201. Optionally, the vehicular edge node may communicate via the network 230 with one or more of the imaging sensors 208 statically deployed in the monitored location 201 to receive images captured by these imaging sensor(s) 208.

The edge node safety system 200 may include a network interface 210 for connecting to the network 230, a processor(s) 212 for executing a process such as the process 100 and a storage 214 for code (program store) and/or data storage. The edge node safety system 200 may optionally comprise an Input/Output (I/O) interface 216 for connecting to one or more of the imaging sensor(s) 208.

The network interface 210 may include one or more wired and/or wireless network interfaces for connecting to the network 230 to enable the edge node safety system 200 to communicate with one or more remote networked resources 240, for example, a remote server, a remote computing node, a cloud service, a cloud platform and/or the like.

Via the network interface 210, the edge node safety system 200 may further connect to one or more of the imaging sensor(s) 208 deployed to monitor the monitored location 201 assuming these imaging sensor(s) 208 have wired and/or wireless network connectivity. For example, one or more of the imaging sensor(s) 208 may connect to one or more of the access point(s) 206 via one or more wired and/or wireless connections. The edge node safety system 200 connecting to the access point(s) 206 either directly and/or via the network 230 may therefore communicate with the network connected imaging sensor(s) 208 via the network interface 210.

Optionally, the edge node safety system 200 connects to one or more of the imaging sensor(s) 208 via the I/O interface 216 which may include one or more wired and/or wireless interfaces, for example, a Universal Serial Bus (USB) interface, a serial interface, a Radio Frequency (RF) interface, a Bluetooth interface, a WLAN interface (e.g. Wi-Fi) and/or the like selected and adapted to enable communication with the imaging sensor(s) 208.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, a hard drive, a Solid State Disk (SSD), a magnetic disk and/or the like and/or one or more volatile devices, for example, a RAM device, a cache memory and/or the like. The storage 214 may further comprise one or more network storage resources, for example, a storage server, a network accessible storage (NAS), a network drive, a cloud storage and/or the like accessible via the network interface 210.

The processor(s) 212 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 214 and executed by one or more processors such as the processor(s) 212. For example, the processor(s) 212 may execute a safety service application 220 (safety application 220 herein after) for executing the process 100.

The safety application 220 may further utilize one or more hardware elements integrated and/or available in the edge node safety system, for example, a circuit, a component, an Integrated Circuit (IC), an Application Specific Integrated Circuit (ASIC), a Field Programmable Gate Array (FPGA), a Digital Signals Processor (DSP), a network processor and/or the like.

The safety application 220 may further communicate with one or more of the remote network resources 240, for example, a safety service platform, a database, one or more other instances of the safety application 220 executed by one or more other safety systems 200 and/or the like.

As shown at 102, the process 100 starts with the safety application 220 receiving one or more images, for example, an image, a sequence of images, a video stream and/or the like captured by one or more of the imaging sensors 208 monitoring the monitored location 201.

The safety application 220 may analyze one or more of the received images to identify one or more of the passerby users 202 located, travelling and/or passing through the monitored location 201. The safety application 220 may apply one or more methods, tools, algorithms and/or techniques as known in the art for analyzing the image(s) to identify the passerby user(s) 202. For example, the safety application 220 may analyze the image(s) using one or more computer vision and/or image processing methods adapted to identify the passerby user(s) 202. In another example, the safety application 220 may apply to the image(s) one or more Machine Learning (ML) models, for example, a neural network, a Support Vector Machine (SVM) and/or the like trained to identify the passerby user(s) 202 in the captured image(s).

In particular, the safety application 220 may analyze the image(s) to identify one or more of the passerby users 202 who are preoccupied by interaction with their mobile devices 204, specifically preoccupied by watching the screen of the mobile device 204 and are therefore inattentive to their surrounding environment. For example, using computer vision tool(s), the safety application 220 may identify one or more posture and/or gesture attributes of one or more of the passerby user(s) 202 which may be indicative that a respective passerby user 202 is looking at the screen of his mobile device 204, for example, a bodily posture, a head posture, a gaze direction, a hand gesture and/or the like. In another example, the ML model(s) applied by the safety application 220 may be trained to identify passerby users 202 preoccupied by looking at the screen of mobile devices 204 by training this ML model(s) using training samples (images) depicting people engaged with mobile devices 204, specifically watching the screen of the mobile devices 204.

Based on the analysis of the image(s), the safety application 220 may determine that one or more of the passerby user(s) 202 is preoccupied by watching the screen of an associated mobile device 204.

Optionally, the safety application 220 may determine that one or more of the passerby user(s) 202 is preoccupied by watching the screen of his associated mobile device 204 based on an engagement indication received from receive a respective client device 204 which is associated with the respective passerby user 202. The mobile device 204 may apply one or more methods and/or techniques as known in the art for detecting that the associated passerby user 202 is preoccupied by watching the screen, for example, detecting interaction with the client device 204, detecting a gaze of the passerby user 202 directed to the screen and/or the like.

Naturally, in order to determine that a certain passerby user 202 is preoccupied by watching the screen of his associated mobile device 204 based on the engagement indication received from the associated mobile device 204, specifically in case there are multiple passerby people in the monitored location 201, the safety application 220 needs to decisively and reliably correlate between the certain preoccupied passerby user 202 and his associated client device 204.

This correlation may be based on correlation records of the safety service associated with edge node safety system 200 to which one or more of the preoccupied passerby users 202 have registered in the past. As part of the registration process for registering to the safety service, each registered user provides an identifier (ID) of each of one or more mobile device 204 associated with him. The ID of each associated mobile device 204 which is assigned to uniquely identify the respective mobile device 204 may include, for example, a Mobile Identification Number (MIN), a Mobile Subscription Identification Number (MSIN), a Media Access controller (MAC) address and/or the like.

The registration information, specifically the correlation records comprising the IDs of the mobile devices 204 associated with all the registered users may be stored in one or more storage resources, for example, a database and/or the like which is accessible to the safety service, specifically accessible to the safety application 220.

Optionally, in order to maintain and ensure privacy of the registered users, the stored correlation records do not include identification information of the registered user, for example, a name, an ID number, an address and/or the like.

The safety application 220 having access to the stored correlation records may apply one or more methods and/or techniques using these correlation records to correlate between one or more of the preoccupied passerby users 202 and their associated client devices 204.

According to some embodiments of the present invention, the safety application 220 may correlate between one or more of the preoccupied passerby users 202 and their associated client devices 204 according to a relative location of a respective client device 204 with respect to the respective preoccupied passerby user 202.

It should be noted that the correlation does not essentially require recognition of the preoccupied passerby user(s) 202, i.e. no need to determine the identity of the preoccupied passerby user(s) 202. It is sufficient for the safety application 220 to identify the preoccupied passerby user(s) 202 in the sense of identifying him and distinguishing him from other passerby people detected in the monitored location 201. For example, the safety application 220 may identify a certain preoccupied passerby user 202 based on his cloths to distinguish him from the other passerby people in the monitored location 201. In another example, the safety application 220 may identify a certain preoccupied passerby user 202 based on a hat, a burka, shoes, a bag and/or the like the certain preoccupied passerby user 202 is wearing and/or carrying.

As such, for the correlation of one or more of the preoccupied passerby users 202 with their respective client devices 204, the identification of the preoccupied passerby user(s) 202 may be done by the safety application to identify his location with respect to the location of his associated client device(s) 204.

Furthermore, assuming a group (e g family, a party of people, etc.) is correlated with a certain client device 204 used by one of the group members, the safety application 220 may correlate the entire group with the certain client device 204 such that even if the one or more of the group members is identified to be preoccupied by watching the screen of another client device, all group members are still correlated with the certain client device 204 which may be used by the safety application to alert the group by transmitting warning message(s) to the certain client device 204 (which is correlated with the group) as described herein after.

The safety application 220 may apply one or more methods, techniques and/or implementation to correlate one or more of the preoccupied passerby users 202 with their respective client devices 204.

For example, assuming the safety application 220 identifies, based on the analysis of the image(s), that a certain preoccupied passerby user 202 is located at a certain (specific) location in the monitored location 201. The safety application 220 may transmit a hand-shake request message to each of a plurality of client devices 204 using the IDs stored in the correlation records, in particular, IDs of client devices 204 identified in the monitored location 201. The safety application 220 may obtain the IDs of (on-site) client devices 204 associated with passerby persons who are currently located in the monitored location 201 from the access point(s) 206 providing network connectivity to the client devices 204 currently located in the monitored location 201 and hence having the ID of each of these on-site client devices 204.

In response to the hand-shake request message, each of the on-site client devices 204 may respond with one or more response signals detectable by the safety application 220. The response signals may include for example, one or more visual signals, for example, a blink of the screen of the client device 204, a flash of the flash of the camera of the client device 204 and/or the like which may be detected by one or more of the imaging sensor(s) 208 deployed to monitor the monitored location 201 and connected to the edge node safety system 200. In another example, the response signals may include, one or more audio signals, for example, a beep sound generated by one or more speakers of the client device 204 and/or the like which may be detected by one or more audio sensors (e.g. sound sensor, microphone, etc.) deployed in the monitored location 201 and connected to the edge node safety system 200.

The safety application 220 may detect the response signal(s) and may identify the location of the on-site client device 204 which responded with the response signal(s). Based on the relative location of the responding on-site client device 204 with respect to the certain location of the certain preoccupied passerby user 202 identified in the monitored location 201, the safety application 220 may correlate between the certain preoccupied passerby user 202 and his associated on-site client device 204.

Specifically, the safety application 220 may transmit the hand-shake request messages in series to the on-site client devices 204 (according to their IDs) in order to deterministically determine which of the on-site client devices 204 responded to which of the hand-shake request message based on the timing of the hand-shake request message and its responsive visual indication.

In another example, assuming the safety application 220 identifies, based on the analysis of the image(s), that a certain preoccupied passerby user 202 is located at a certain (specific) location in the monitored location 201. The safety application 220 may apply one or more triangulation algorithms as known in the art to identify the specific mobile device 204 which is located at the same location of the certain preoccupied passerby user 202 based on data collected from multiple wireless transceivers which communicate with the on-site mobile device(s) 204. Based on the relative location of each on-site mobile device 204 coupled with its ID provided in the triangulation process, the safety application 220 may determine which of the on-site mobile device(s) 204 is the specific mobile device 204 located at the certain location of the certain preoccupied passerby user 202.

Optionally, the safety application 220 transmits one or more hand-shake request messages to the on-site client device(s) 204 to request the on-site client device(s) 204 to initiate and/or participate in the triangulation process.

According to some embodiments of the present invention, the safety application 220 may correlate one or more of the preoccupied passerby users 202 with their associated client devices 204 according to face recognition of the respective preoccupied passerby user(s) 202.

During the registration process conducted by the registered users for registering to the safety service, one or more of the registered preoccupied passerby user 202 may have provided a photograph of his face together with the (ID) of each of one or more mobile device 204 associated with him. The correlation record stored for each such registered preoccupied passerby user 202 therefore includes the face photograph of the respective registered preoccupied passerby user 202 correlated with the ID of his associated client device(s) 204.

The safety application 220, analyzing the captured image(s) using one or more face recognition methods, techniques, tools and/or algorithms as known in the art, may extract a capture of the face of one or more of the preoccupied passerby users 202. The safety application 220 may then access the storage resource(s) storing the correlation records and may compare between the captured face(s) of the preoccupied passerby user(s) 202 and the face photographs stored in the correlation records. In case of a match, for each match, the safety application 220 may retrieve (obtain) the ID of the respective mobile device 204 correlated with the photograph in the respective correlation record.

Once one or more of the passerby user(s) 202 are correlated with their respective mobile devices 204 using any of the aforementioned methods, the safety application 220 may communicate with the one or more of the correlated mobile devices 204 to receive the engagement indication indicating the respective associated passerby user(s) 202 is preoccupied. Furthermore, one or more of the client devices 204 may execute a local safety service agent configured to communicate with the safety service via the network 230, in particular with the safety application 220 in one or more monitored locations, specifically in the monitored location 201 in which the passerby user(s) 202 is currently located. The safety application 220 may therefore communicate with the safety service agent executed by one or more of the correlated client device 204 to receive the engagement indication for the respective associated preoccupied passerby user(s) 202.

Moreover, the safety application 220 may maintain the correlation between one or more of the preoccupied passerby user(s) 202 and their respective client devices 204 during part or all of the time during which the respective preoccupied passerby user 202 is located and monitored in the monitored location 201. Optionally, in order to maintain and ensure privacy of the registered users, the safety application 220 discards all records, logs and/or indications relating to the preoccupied passerby user(s) 202 identified in the monitored location 201 after the process 100 is complete.

After identifying the preoccupied passerby users 202 in the monitored location 201, the safety application 220 may further analyze one or more of the received images, typically several consecutive images to estimate a motion pattern of one or more of the preoccupied passerby users 202. The motion pattern of each preoccupied passerby user 202 may include, for example, a direction of advancement, a speed of advancement, an acceleration, an estimated advancement path and/or the like. The safety application 220 may identify the motion pattern(s) based on analysis of the images conducted using one or more of the methods, tools, techniques and/or algorithms described herein before, for example, the computer vision tool(s), the image processing tool(s), the trained ML model(s) and/or the like as known in the art.

As shown at 106, the safety application 220 further analyzes the received image(s) to identify one or more potential risk events involving one or more of the preoccupied passerby user(s) 202 detected in the monitored location 201. In particular, the safety application 220 analyzes the received image(s) with respect to the motion pattern(s) estimated for the preoccupied passerby user(s) 202.

The potential risk events are events which may present potential harm, for example, injury, death damage to property and/or the like to one or more of the preoccupied passerby user(s) 202 and/or to one or more other passerby persons, pets and/or the like, for example, injury.

The potential risk events may include, for example, an event in which one or more of the preoccupied passerby user(s) 202 may trip on, into and/or over one or more obstacles identified in the monitored location 201, for example, a hole or a crack in the ground (e.g. sidewalk, etc.), a sidewalk edge, a stair, an object (e.g. a street pole, a traffic light, debris, waste, bicycle, garbage can, etc.) and/or the like. In another example, the potential risk events may include, for example, an event in which one or more of the preoccupied passerby user(s) 202 may collide with one or more other passerby persons, pets and/or the like. In another example, the potential risk events may include, for example, an event in which one or more of the preoccupied passerby user(s) 202 may collide with one or more vehicles, for example, when stepping into a street (road), for example, a bicycle rider, a motor vehicle (e.g. car, motorcycle, bus, track, etc.) and/or the like.

The safety application 220 may therefore analyze the captured image(s) depicting the monitored location to identify one or more of the potential risk events based on the estimated motion pattern of one or more of the preoccupied passerby users 202 with respect to the other objects detected in the scene, i.e. in the environment surrounding the preoccupied passerby user(s) 202, specifically his near surroundings.

For example, based on the image(s) analysis, the safety application 220 may identify that the estimated motion pattern of a preoccupied pedestrian passerby user 202, for example, his path (trajectory) may lead the preoccupied pedestrian passerby user 202 to trip over stair detected in the estimated path. In another example, based on the image(s) analysis, the safety application 220 may identify that the estimated motion pattern of a preoccupied pedestrian passerby user 202, for example, his speed and direction may lead the preoccupied pedestrian passerby user 202 to collide (bump into) with a traffic sign detected ahead of him In another example, the safety application 220 may identify that the estimated motion pattern of a preoccupied bicycle rider passerby user 202, for example, his speed and direction may lead the preoccupied bicycle rider passerby user 202 to collide with one or more pedestrians detected ahead of him In another example, the safety application 220 may identify that the estimated motion pattern of car driven a preoccupied driver passerby user 202, for example, the car speed, direction and/or estimated path may lead the preoccupied driver passerby user 202 to hit (collide) one or more pedestrians detected in the estimated path.

Figure 3:
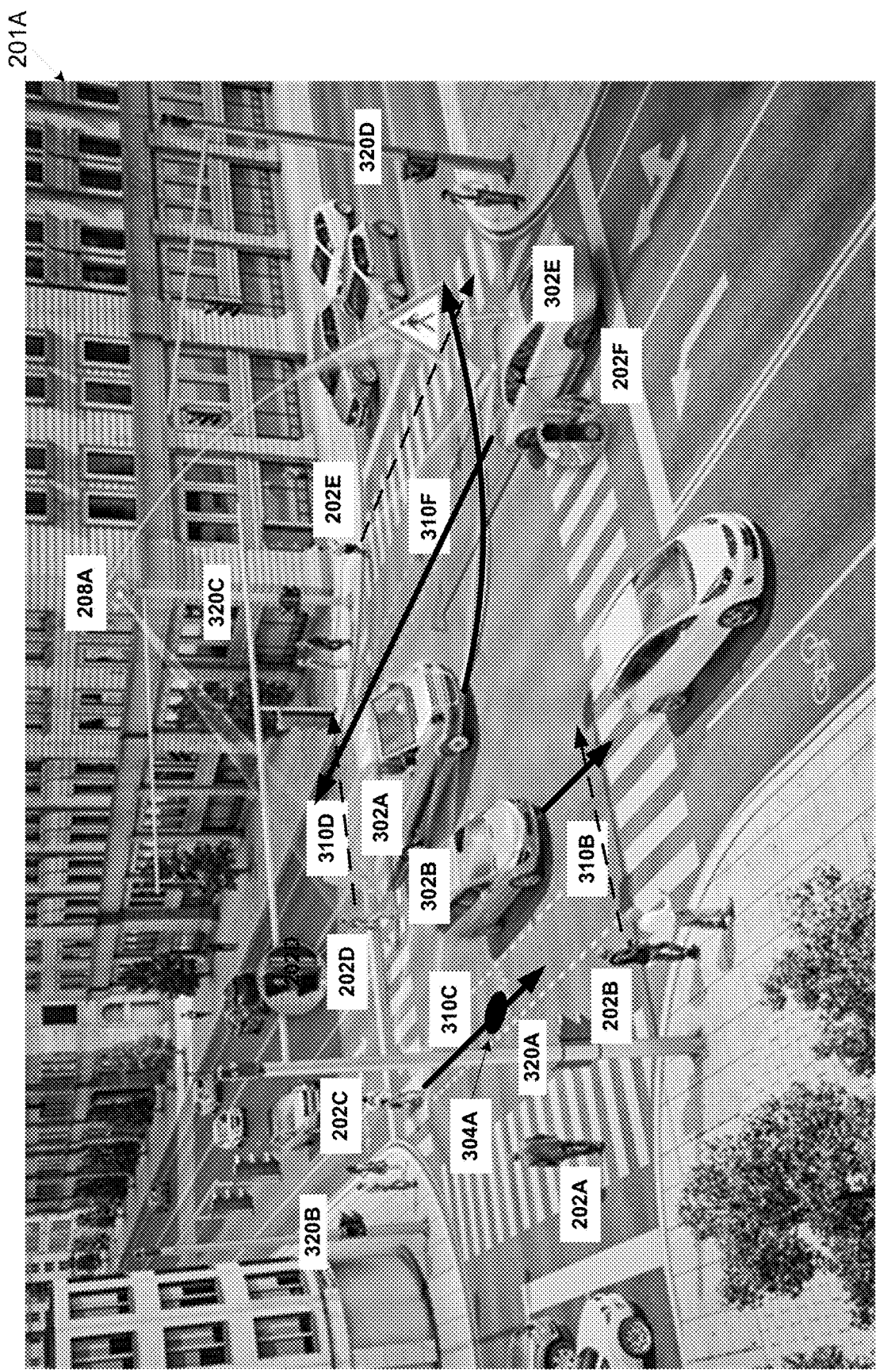
FIG. 3 is a schematic illustration of an exemplary monitored location deployed with a system for identifying a potential risk event involving passerby users preoccupied with their mobile devices and alerting them accordingly, according to some embodiments of the present invention.

Reference is now made to FIG. 3, which is a schematic illustration of an exemplary monitored location deployed with a system for identifying a potential risk event involving passerby users preoccupied with their mobile devices and alerting them accordingly, according to some embodiments of the present invention. An imaging sensor 208A such as the imaging sensor 208 may be deployed to monitor an exemplary monitored location such as the monitored location 201, for example, a street intersection 201A.

The imaging sensor 208A may capture one or more images depicting the street intersection monitored location 201A and one or more passerby persons in particular one or more passerby users 202 such as the passerby users 202 each associated with an associated mobile device such as the mobile device 204, for example, a pedestrian passerby user 202A, a pedestrian passerby user 202B, a bicycle rider passerby user 202C, a pedestrian passerby user 202D, a pedestrian passerby user 202E and a driver passerby user 202F. One or more of the passerby users 202 may be preoccupied by watching the screen of their associated client device 204, for example, the pedestrian passerby user 202B, the bicycle rider passerby user 202C, the pedestrian passerby user 202D and/or the driver passerby user 202F.

A safety application such as the safety application 220 executed by a safety system, in particular an edge node safety system such as the edge node safety system 200 may execute a process such as the process 100 to identify one or more risk events involving one or more of the preoccupied passerby users 202B, 202C, 202D and/or 202F.

The safety application 220 may determine that the passerby users 202B, 202C, 202D and/or 202F are preoccupied, for example, based on analysis of the image(s) captured by the imaging sensor 208A to depict the street intersection 201A. In another example, the safety application 220 may determine that the passerby users 202B, 202C, 202D and/or 202F are preoccupied based on the engagement indication received from one or more of the client devices 204 associated with the preoccupied passerby users 202B, 202C, 202D and/or 202F after correlating each associated client device 204 with its respective preoccupied passerby users 202B, 202C, 202D and/or 202F.

The safety application 220 may further analyze the captured image(s) to compute an estimated motion pattern for one or more of the preoccupied passerby users 202, for example, a motion pattern 310B for the preoccupied pedestrian passerby user 202B, a motion pattern 310C for the preoccupied pedestrian passerby user 202C, a motion pattern 310D for the preoccupied pedestrian passerby user 202D and a motion pattern 310F for the preoccupied driver passerby user 202F.

The safety application 220 may then analyze the captured image(s) with respect to one or more of the estimated motion patterns, for example, the motion patterns 310B, 310C, 310D and/or 310D to identify one or more potential risk events which may potentially involve one or more of the respective preoccupied passerby users 202B, 202D and/or 202D.

For example, based on the analysis of the image(s) with respect to the motion pattern 310B, the safety application 220 may identify that the estimated path of the preoccupied pedestrian passerby user 202B may potentially intersect with a path estimated for a vehicle 302B such that the preoccupied pedestrian passerby user 202B may potentially be hit (collide) by the vehicle 302B. In another example, based on the analysis of the image(s) with respect to the motion pattern 310C estimated for the preoccupied pedestrian passerby user 202B, the safety application 220 may identify a hole in the ground 304A that is located in the estimated path of the preoccupied bike rider passerby user 202C such that the preoccupied bike rider passerby user 202C may potentially fall into the hole 304A. In another example, based on the analysis of the image(s) with respect to the motion pattern 310D, the safety application 220 may identify that the estimated path of the preoccupied pedestrian passerby user 202D may potentially intersect with a path estimated for a vehicle 302E such that the preoccupied pedestrian passerby user 202D may potentially be hit (collide) by the vehicle 302E. In another example, based on the analysis of the image(s) with respect to the motion pattern 310E, the safety application 220 may identify that the estimated path of the vehicle 302E driven by the preoccupied driver passerby user 202E may potentially intersect with a path estimated for a vehicle 302A such that the vehicle 302E may collide (crash) with the vehicle 302A.

As shown at 108, the safety application 220 may transmit one or more warning messages to alert one or more of the preoccupied passerby users 202 estimated to be involved in one or more of the potential risk events. The safety application 220 may transmit the warning message(s) using one or more methods.

In some embodiments, specifically in cases where one or more of the preoccupied passerby user(s) 202 are correlated with their respective associated client devices 204, the safety application 220 may transmit one or more of the warning messages to one or more of the client device 204 correlated with their associated preoccupied passerby user(s) 202. The safety application 220 may communicate with the correlated client device(s) 204 using one or more communication methods as known in the art. However, in case one or more of the correlated client device(s) 204 execute the safety service agent, the safety application 220 may transmit the warning message(s) to the safety service agent to alert the respective preoccupied passerby user(s) 202.

The warning message(s) transmitted by the safety application 220 to the correlated client device 204 may be also designed and configured to alert the respective preoccupied passerby user 202 of the potential risk event(s), in particular, to break the engagement of the respective preoccupied passerby user 202 with the screen of his associated client device 204 and direct his attention to his surrounding environment. However, the warning messages transmitted by the safety application 220 to the client device 204 correlated with the preoccupied passerby user 202 may include, for example, a visual warning, an audible warning, a tactile warning (vibration, etc.) and/or the like. For example, the warning message(s) may include an instruction to the correlated client device 204 to turn off (blacken) its screen. In another example, the warning message(s) may include an instruction to the correlated client device 204 to operate present a visual message on its screen stating, for example, "be careful, you are in danger". In another example, the warning message(s) may include an instruction to the correlated client device 204 to operate its integrated speaker to transmit an audible indication of the potential risk event(s), for example, "beware, a bicycle is coming from your left".

Optionally, the safety application 220 transmits one or more of the warning messages to one or more of the client devices 204 correlated with respective preoccupied passerby users 202 according to a risk score computed for one or more of the potential risk events that the safety application 220 estimates the respective preoccupied passerby users 202 may be involved in. The safety application 220 may compute the risk score of one or more of the potential risk events according to one or more event attributes of the respective potential risk events, for example, severity, potential harm, number of involved passerby users 202 and/or the like. The safety application 220 may compute and/or adjust the risk score of one or more of the potential risk events according to one or more rules, for example, a rule, a guideline, a scale, a lookup table and/or the like predefined for one or more of the potential risk events. The rule(s) predefined for one or more of the potential risk events may be stored in one or more of the networked resources 240, for example, a database, a cloud platform and/or the like accessible to the safety service, in particular accessible to the edge node safety system 200 executing the safety application 220.

For example, assuming that based on the motion pattern estimated for a certain pedestrian preoccupied passerby user 202, the safety application 220 estimates that the certain preoccupied pedestrian passerby user 202 may unintentionally step into a road and may be involved in a high severity potential risk event, for example, get hit by a passing car. In such case the safety application 220 may assign a high risk score to the car hit potential risk event. Due to the high risk score assigned to this high severity potential risk event, the safety application 220 may rapidly transmit multiple warning messages to alert the certain preoccupied pedestrian passerby user 202 via the directional speaker(s), via messages to the client device 204 correlated with the certain preoccupied pedestrian passerby user 202 and/or both. In such case, the safety application 220 may further configure the warning message(s) to significantly and quickly increase alertness of the certain preoccupied pedestrian passerby user 202, for example, transmit warning message(s) indicating the correlated client device 204 to initiate both audible and visual warning messages to alert the certain preoccupied pedestrian passerby user 202 of the car hit potential risk event.

In another example, assuming that based on the motion pattern estimated for a certain pedestrian preoccupied passerby user 202 travelling in a park monitored location 201, the safety application 220 estimates that the certain preoccupied pedestrian passerby user 202 may be involved, with low probability, in a low severity potential risk event, for example, stepping into a shallow hole in the ground. In such case the safety application 220 may assign a relatively low risk score to the hole potential risk event. Due to the relatively low risk score assigned to this potential risk event, the safety application 220 may transmit warning message(s) to the correlated client device 204 which may gently alert the certain preoccupied pedestrian passerby user 202 without frightening him.

Optionally, the safety application 220 transmits one or more of the warning messages to one or more of the client devices 204 correlated with respective preoccupied passerby users 202 according to a responsiveness score computed for one or more of the preoccupied passerby users 202. The safety application 220 may compute the responsiveness score of one or more of the preoccupied passerby users 202 according to one or more user attributes of the respective preoccupied passerby users 202, for example, age, attentiveness and/or the like. The safety application 220 may compute and/or adjust the responsiveness score of one or more of the preoccupied passerby users 202 according to one or more rules, for example, a rule, a guideline, a scale, a lookup table and/or the like predefined for preoccupied passerby users. The predefined rule(s) may be stored in one or more of the networked resources 240, for example, a database, a cloud platform and/or the like accessible to the safety service, in particular accessible to the edge node safety system 200 executing the safety application 220.

For example, assuming that based on the motion pattern estimated for a certain pedestrian preoccupied passerby user 202, the safety application 220 estimates that the certain preoccupied pedestrian passerby user 202, in particular an elderly preoccupied pedestrian passerby user 202 may unintentionally step into a bicycle trail and may be involved in a potential risk event, for example, get hit by a bike rider. In such case the safety application 220 may assign a low responsiveness score to the elderly preoccupied pedestrian passerby user 202 who may be less aware to his surrounding environment and hence to the approaching bike rider. The safety application 220, based on the low responsiveness score may rapidly, continually and/or urgently transmit one or more warning messages to the client device 204 correlated with the elderly preoccupied pedestrian passerby user 202. In contrast, assuming the certain pedestrian preoccupied passerby user 202 estimated by the safety application 220 to be involved in the bike rider collision is a young and more attentive person, safety application 220 may assign a high responsiveness score to the young preoccupied pedestrian passerby user 202 who may be more aware to his surrounding environment and hence to the approaching bike rider. In such case, the safety application 220 may transmit warning message(s) to the correlated client device 204 which may alert the young preoccupied pedestrian passerby user 202 with relatively little urgency.

Optionally, the safety application 220 monitors a plurality of preoccupied passerby users 202 identified in the monitored location 201 and estimated to be involved in a plurality of potential risk events according to a priority order computed for the plurality of preoccupied passerby users based on a potential risk event score computed for each of the plurality of potential risk events. This may enable scalability of the edge node safety system 200 to monitor and alert of the potential risk events according to the computing resources (e.g. processing resources, storage resources, communication resources, etc.) available to the safety application 220 at the edge node safety system 200. As such a safety application 220 executed by a high end edge node safety system 200 having extensive computing resources may monitor a large number of potential risk events while a safety application 220 executed by a low end edge node safety system 200 having limited computing resources may monitor only part of the potential risk events, specifically one or more high scoring potential risk events.

The safety application 220 may compute the potential risk event score for each of the plurality of potential risk events based on the motion patterns estimated for the preoccupied passerby users 202 with respect to the respective potential risk event. The potential risk event score computed for a potential risk event may therefore reflect the potential severity, potential harm, magnitude (e.g. number of involved passerby users 202) of the respective potential risk event coupled with the estimated alertness and responsiveness of the preoccupied passerby users 202 to the respective potential risk event. For example, the safety application 220 may compute the potential risk event score for one or more of the potential risk events by aggregating the risk score computed for the respective potential risk event and the responsiveness score computed for the preoccupied passerby users 202 estimated to be involved in the respective potential risk event.

For example, the safety application 220 may assign a high potential risk event score to a certain potential risk event involving a plurality of passerby user 202, for example, a vehicle driven by a preoccupied driver passerby user 202 which crosses a cross-road in a red light and may hit multiple passerby user 202 crossing the cross-road. In another example, the safety application 220 may assign a high potential risk event score to a certain potential risk event involving an elderly preoccupied pedestrian passerby user 202, for example, the elderly preoccupied pedestrian passerby user 202 is estimated to unintentionally step into large hole in the sidewalk which may result in a major injury. In contrast, the safety application 220 may assign a low potential risk event score to a certain potential risk event involving two young preoccupied pedestrian passerby user 202 who may collide with each other and are estimated to suffer only little harm if at all. In another example, the safety application 220 may assign a high potential risk event score to a certain potential risk event involving a plurality of passerby user 202, for example, a vehicle driven by a preoccupied driver passerby user 202 which crosses a cross-road in a red light and may hit multiple passerby user 202 crossing the cross-road.

Optionally, the safety application 220 monitors one or more of the preoccupied passerby users 202 and/or transmits the warning message(s) to their mobile devices 204 according to one or more rules defined by a user profile defined for the respective preoccupied passerby users 202 in the safety service. Monitoring and/or alerting the preoccupied passerby users 202 based on the rules defined by their user profiles may be of course applicable for the preoccupied passerby user(s) 202 who are correlated with their client device(s) 204 in the monitored location 201 and are registered to the safety service. The user profiles created for one or more of the registered users may be stored in one or more of the networked resources 240, for example, a database, a cloud platform and/or the like accessible to the safety service, in particular accessible to the edge node safety system 200.

One or more registered users registered to the safety service may create a user profile defining one or more rules for monitoring and alerting of the potential risk events. The users profile, specifically the rule(s) may be later used by the safety service, in particular by the safety application 220 executed by one or more edge node safety systems 200 associated, correlated and/or part of the safety service. In case the safety application 220 identifies a registered user as a preoccupied passerby user 202 in one or more monitored locations 201, the safety application 220 may access the respective user profile of the identified registered preoccupied passerby user 202 and may apply the rule(s) defined in the user profile for monitoring the preoccupied passerby user 202 and alerting him of potential risk events accordingly.

The rule(s) may define monitoring and/or alerting parameters and/or preferences of the respective registered user which the user would like the safety application 220 when he is identified in one or more monitored locations such as the monitored location 201, in particular when identified as a passerby user 202 preoccupied by watching the screen of his associated client device 204.

For example, one or more rules in a certain user profile of a certain user may define one or more locations in which in case the user is identified as a preoccupied passerby user 202, the user should be monitored for potential risk events and alerted accordingly. The certain user profile may further include one or more rules defining one or more other locations in which even if identified as a preoccupied passerby user 202, the user should not be monitored for potential risk events and accordingly not alerted. In another example, one or more rules in a certain user profile of a certain user may define that in case the user is identified as a preoccupied pedestrian passerby user 202, the user should not be monitored for potential risk events and hence not alerted. However, the certain user profile may include one or more rules defining that in case the user is identified as a preoccupied driver passerby user 202, the user should be monitored for potential risk events and alerted accordingly.

According to some embodiments of the present invention, the safety service, in particular the safety application 220 deployed in one or more edge node safety systems 200 monitors and alerts one or more of the preoccupied passerby users 202 of one or more potential non-risk events requiring attention of the respective preoccupied passerby user 202.

The safety application 220 monitoring the preoccupied passerby user(s) 202 identified in the monitored location 201, specifically preoccupied passerby user(s) 202 registered to the safety service and correlated with their mobile device(s) 204, may transmit one or more attention messages to the preoccupied passerby user(s) 202 to draw, direct and/or raise the attention of the preoccupied passerby user(s) 202 to the potential non-risk event(s). Monitoring and alerting the respective preoccupied passerby users 202 for the potential non-risk events may be defined by one or more rules defined in the user profiles of the respective preoccupied passerby users 202 registered to the safety service.

Therefore, when detecting a certain preoccupied passerby user 202 in the monitored location 201, the safety application 220 may access the user profile of the certain preoccupied passerby user 202 and apply the rules defined by the user profile for the preoccupied passerby user 202 to monitor and alert the preoccupied passerby user 202 of one or more of the potential non-risk events.

The potential non-risk events may include, for example, an event in which one or more other persons in the monitored location 201 attempts to draw attention of the preoccupied passerby user 202. For example, a person may be waving to draw the attention of a certain preoccupied passerby user 202. In such case, the safety application 220 may transmit one or more attention messages to the client device 204 correlated with the certain preoccupied passerby user 202 to draw his attention to the waving person. The safety application 220 may further adjust the attention message(s) to indicate a relative location and/or direction of the waving person.

In another example, the potential non-risk events may include an event in which one or more other persons associated with the preoccupied passerby user 202 attempts to draw attention of the preoccupied passerby user 202, for example, a child, a family member and/or the like. For example, a child may be running besides his mother who is preoccupied watching the screen of her client device 204 and thus inattentive to her son. In such case, the safety application 220 may transmit one or more attention messages to the client device 204 correlated with the mother preoccupied passerby user 202 to draw her attention to her son.

In another example, the potential non-risk events may include an event in which the attention of a plurality of people is focused on a certain object, in a certain direction and/or the like which may indicate that something of importance is taking place at the point of focus. For example, a plurality of passerby users 202 may be identified to simultaneously look at an acrobat performing an acrobatic act in a square in the monitored location 201. In such case, the safety application 220 may transmit one or more attention messages to one or more client devices 204 correlated with respective preoccupied passerby users 202 to draw their attention to the acrobatic act. The safety application 220 may further adjust the attention message(s) to indicate a relative location and/or direction of the acrobat with respect to the respective preoccupied passerby users 202.

As described herein before one or more of the passerby users 202, specifically registered passerby users 202 may use the local safety service agent which is executed by their associated client devices 204 and configured to communicate with the safety service via the network 230, specifically with the safety application 220.

The local safety service agent may be further configured to support several monitoring modes which define the monitoring and/or alert services required from the safety application 220 for the respective preoccupied passerby users 202. As such, the safety application 220 may monitor and/or alert one or more of the registered preoccupied passerby users 202 identified in the monitored location 201 according to the monitoring mode set in the local safety service agent executed by the mobile devices 204 correlated with these registered preoccupied passerby users 202.

The monitoring modes may include, for example, a disable mode in which the local safety service agent indicates the safety application 220 not to monitor and alert the respective preoccupied passerby user 202 of any potential risk and non-risk events. The monitoring modes may further include a monitored mode in which the local safety service agent indicates the safety application 220 to monitor and alert the respective preoccupied passerby user 202 accordingly of one or more of the potential risk and/or non-risk events, optionally according to the rule(s) defined in the user profile of the respective preoccupied passerby user 202.

The monitoring modes may also include a self-protection mode in which the client device 204 correlated with the respective preoccupied passerby user 202 may self-generate one or more warning messages independently of the safety application 220 to alert the preoccupied passerby user 202 of one or more of the potential risk and/or non-risk events, optionally according to the rule(s) defined in the user profile of the respective preoccupied passerby user 202. In such case, the local safety service agent may use data obtained from one or more sensors and/or processing units of the client device, for example, a camera, a microphone and/or the like to monitor the surrounding environment of the preoccupied passerby user 202. When detecting a potential risk and/or non-risk event based on analysis of data obtained from the sensor(s) of the client device 204, the local safety service agent may generate the warning message(s) to alert the respective preoccupied passerby user 202 of the potential risk and/or non-risk event.

According to some embodiments of the present invention, the safety application 220 may operate one or more directional speakers deployed in the monitored location 201 and adapted to emit a narrow sound beam audible mainly and optionally solely to passerby user(s) 202 located along the advancement vector of the narrow sound beam. The safety application 220 may therefore operate the directional speaker(s) to transmit the warning message(s) in the direction of one or more of the preoccupied passerby user(s) 202 estimated to be involved in one or more of the imminent potential risk events. The directional speakers may be deployed at certain locations in the monitored location 201 to make them effective to deliver the warning message(s) to the preoccupied passerby user(s) 202, for example, on traffic poles, light poles, street corners and/or the like. For example, in the monitored location 201A, one or more directional speakers may be deployed on one or more traffic light poles 320A, 320B, 320C and/or 320D.

The safety application 220 may further adjust one or more operational parameters of one or more of the directional speakers, for example, volume, audio beam direction and/or the like in order to increase probability that the preoccupied passerby user(s) 202 hears the warning message(s). To support this, one or more of the directional speakers may be movable by one or more actuators, engines and/or the like to change their audio transmission direction such that their transmitted sound beam is directed towards the location of one or more of the preoccupied passerby users 202. In another example, one or more directional speakers may include a multi-beam speaker configured to emit narrow sound beam in multiple directions which may be operated electronically (no actuator(s)) by the safety application 220 to emit the sound beam in one or more certain directions. The safety application 220 may adjust the operational parameters of the directional speaker(s) according to the current location of the preoccupied passerby user(s) 202 identified based on the analysis of the images(s) captured to depict the monitored location 201.

The audible warning message(s) transmitted to the preoccupied passerby user 202 via the directional speaker(s) may be designed and configured to alert the respective preoccupied passerby user 202 of the potential risk event(s), in particular, to break the engagement of the respective preoccupied passerby user 202 with the screen of his associated client device 204 and direct his attention to his surrounding environment. For example, the warning message(s) may include a warning such as, for example, "be careful" to alert the preoccupied passerby user 202 of the potential risk event(s). In another example, the warning message(s) may further include an indication of the potential risk event(s), for example, "be careful, a car coming from your right". In another example, the warning message(s) may further include a command to designed to prevent the preoccupied passerby user 202 from encountering the potential risk event(s), for example, "stop in your place".

Optionally, the safety application 220 may further inform, alert and/or notify one or more emergency services, for example, police, medical services, fire department, municipal services and/or the like of one or more of the potential risk events, in particular, in case the respective potential risk event actually occurred. Moreover, the safety application 220 may notify the appropriate emergency service(s) according to determination of one or more characteristics of the risk event(s) which took place, for example, a type of the risk event (e.g. accident, person fell into a hole, a person hit by a car, a person having a heart attack, etc.), a number of involved people, a severity of injury (trauma) of the involved people and/or the like. Moreover, the safety application 220 may transmit one or more messages to a client device 204 of one or more other passerby users 202 to ask the respective passerby user(s) 202 to assist the people involved in the risk event which took place.

It is expected that during the life of a patent maturing from this application many relevant systems, methods and computer programs will be developed and the scope of the terms image analysis methods, techniques, tools and algorithms are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of transmitting warning messages to alert users preoccupied by interaction with client devices of potential risk events, comprising:
using at least one processor of an edge node located at an edge of a network for:
analyzing at least one image captured by at least one imaging sensor deployed to monitor a monitored location to estimate a motion pattern of at least one passerby user preoccupied by watching a screen of a client device;
analyzing the at least one image with respect to the estimated motion pattern to identify a potential risk event involving the at least one preoccupied passerby user; and
transmitting at least one warning message alert the at least one preoccupied passerby user of the potential risk event, wherein the at least one warning message is transmitted to the client device which is correlated with the at least one preoccupied passerby user, and wherein the client device is correlated with the at least one preoccupied passerby user according to a relative location of the client device with respect to the at least one preoccupied passerby user, the relative location is determined based on a signaling hand-shake conducted with the client device, the signaling hand-shake is based on at least one of:
detecting a visual signal generated by the correlated client device in response to a message received from the edge node,
detecting an audio signal generated by the correlated client device in response to a message received from the edge node,
communicating with the correlated client device via at least one close proximity Radio Frequency (RF) communication channel,
triangulating the correlated client device in the monitored location.

2. The computer implemented method of claim 1, wherein the at least one warning message is transmitted by operating at least one directional speaker deployed in the monitored location to generate at least one audible warning message transmitted towards a specific location of the at least one preoccupied passerby user.

3. The computer implemented method of claim 1, wherein the at least one passerby user is determined to be preoccupied by watching the screen of the client device based on analysis of the at least one image.

4. The computer implemented method of claim 1, wherein the at least one passerby user is determined to be preoccupied by watching the screen of the client device based on an engagement indication received from the correlated client device.

5. The computer implemented method of claim 1, wherein the client device is correlated with the at least one preoccupied passerby user according to face recognition of the at least one preoccupied passerby user based on the analysis of the at least one image compared to a stored record correlating the face of the at least one user with an identifier of the client device.

6. The computer implemented method of claim 1, wherein the potential risk event comprises at least one member of a group consisting of: the at least one preoccupied passerby user tripping on an obstacle identified in the monitored location, the at least one preoccupied passerby user colliding with at least one another passerby person and the at least one preoccupied passerby user colliding with a vehicle.

7. The computer implemented method of claim 1, wherein the potential risk event presents potential harm to at least one of: the at least one preoccupied passerby user and at least one another person, the potential harm comprises at least one member of a group consisting of: injury, death and damage to property.

8. The computer implemented method of claim 1, further comprising transmitting the at least one warning message according to a risk score computed for the potential risk event based on at least one event attribute of the potential risk event.

9. The computer implemented method of claim 1, further comprising transmitting the at least one warning message according to a responsiveness score computed for the at least one preoccupied passerby user base on at least one user attribute of the at least one preoccupied passerby user.

10. The computer implemented method of claim 1, wherein the at least one warning message is transmitted to a safety service agent executed by the client device correlated with the at least one preoccupied passerby user and registered to the safety service at the edge node.

11. The computer implemented method of claim 10, further comprising transmitting the at least one warning message according to at least one rule defined by a user profile of the at least one preoccupied passerby user in the safety service.

12. A computer implemented method of transmitting warning messages to alert users preoccupied by interaction with client devices of potential risk events, comprising:
using at least one processor of an edge node located at an edge of a network for:
analyzing at least one image captured by at least one imaging sensor deployed to monitor a monitored location to estimate a motion pattern of at least one passerby user preoccupied by watching a screen of a client device;
analyzing the at least one image with respect to the estimated motion pattern to identify a potential risk event involving the at least one preoccupied passerby user;
transmitting at least one warning message alert to the at least one preoccupied passerby user of the potential risk event, wherein the at least one warning message is transmitted to a safety service agent executed by the client device correlated with the at least one preoccupied passerby user and registered to the safety service at the edge node, and wherein the at least one warning message is transmitted according to at least one rule defined by a user profile of the at least one preoccupied passerby user in the safety service; and
transmitting at least one attention message to the correlated client device to alert the at least one preoccupied passerby user of at least one potential non-risk event requiring his attention, the potential non-risk event defined by the at least one rule comprises at least one member of a group consisting of: at least one other person attempts to draw attention of the at least one preoccupied passerby user, at least one other person associated with the at least one preoccupied passerby user attempts to draw attention of the at least one preoccupied passerby user, attention of a plurality of people is focused on a certain object in the monitored location and attention of a plurality of people is focused in a certain direction.

13. The computer implemented method of claim 10, further comprising transmitting the at least one warning message according to a monitoring mode set for the at least one preoccupied passerby user in the safety service agent executed by the correlated client device, the monitoring mode is a member of a group consisting of: a disable mode, a monitored mode in which monitoring the at least one preoccupied passerby user is enabled and a self-protection mode in which the correlated client device may self-generate at least one warning message independently of the edge node.

14. The computer implemented method of claim 1, further comprising monitoring a plurality of preoccupied passerby users identified in the monitored location according to priority order computed for the plurality of preoccupied passerby users based on a potential risk event score computed for each of the plurality of users according to the motion pattern estimated for the respective preoccupied passerby user with respect the potential risk event presenting potential harm to the respective preoccupied passerby user.

15. A system for transmitting warning messages to alert users preoccupied by interaction with client devices of potential risk events, comprising:
a storage storing a code; and
at least one processor of an edge node located at an edge of a network, the at least one processor is coupled to the storage for executing the stored code, the code comprising:
code instructions to analyze at least one image captured by at least one imaging sensor deployed to monitor a monitored location to estimate a motion pattern of at least one passerby user preoccupied by watching a screen of a client device;
code instructions to analyze the at least one image with respect to the estimated motion pattern to identify a potential risk event involving the at least one preoccupied passerby user;
code instructions to transmit at least one warning message to alert the at least one preoccupied passerby user of the potential risk event, wherein the at least one warning message is transmitted to a safety service agent executed by the client device correlated with the at least one preoccupied passerby user and registered to the safety service at the edge node; and
code instructions to transmit the at least one warning message according to a monitoring mode set for the at least one preoccupied passerby user in the safety service agent executed by the correlated client device, the monitoring mode is a member of a group consisting of: a disable mode, a monitored mode in which monitoring the at least one preoccupied passerby user is enabled and a self-protection mode in which the correlated client device may self-generate at least one warning message independently of the edge node.

* * * * *